(12) United States Patent
Nakamura et al.

(10) Patent No.: US 9,592,856 B2
(45) Date of Patent: Mar. 14, 2017

(54) UPPER VEHICLE-BODY STRUCTURE OF VEHICLE

(71) Applicant: MAZDA MOTOR CORPORATION, Hiroshima (JP)

(72) Inventors: Takeshi Nakamura, Hiroshima (JP); Keizo Kawasaki, Hiroshima (JP); Kenichi Sato, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/040,560

(22) Filed: Feb. 10, 2016

(65) Prior Publication Data

US 2016/0236722 A1 Aug. 18, 2016

(30) Foreign Application Priority Data

Feb. 18, 2015 (JP) ................................. 2015-029796

(51) Int. Cl.
*B62D 25/06* (2006.01)

(52) U.S. Cl.
CPC .................................... *B62D 25/06* (2013.01)

(58) Field of Classification Search
CPC ............................... B62D 25/06; B62D 25/04
USPC ............................. 296/193.12, 185.1, 208, 30
See application file for complete search history.

(56) References Cited

U.S. PATENT DOCUMENTS

| 2,122,444 | A | * | 7/1938 | Tjaarda | B62D 23/00 296/203.01 |
| 2,269,451 | A | * | 1/1942 | Ford | B62D 23/005 296/205 |
| 4,917,435 | A | * | 4/1990 | Bonnett | B62D 29/00 296/190.08 |
| 5,074,587 | A | * | 12/1991 | Schwede | B62D 21/10 180/311 |
| 5,167,481 | A | * | 12/1992 | Gotz | B66F 9/07545 280/756 |
| 5,803,533 | A | * | 9/1998 | Schulz | B62D 21/00 296/204 |
| 7,090,290 | B2 | * | 8/2006 | Neumeier | B62D 21/00 280/793 |
| 7,556,116 | B2 | * | 7/2009 | Ootani | B60R 21/0136 180/274 |
| 8,398,160 | B2 | * | 3/2013 | Baumann | B60J 7/11 296/187.13 |

(Continued)

FOREIGN PATENT DOCUMENTS

| JP | 2002-248943 A | 9/2002 |
| JP | 2014-058224 A | 4/2014 |

*Primary Examiner* — Jason S Morrow
*Assistant Examiner* — E Turner Hicks
(74) *Attorney, Agent, or Firm* — Studebkaer & Brackett PC

(57) ABSTRACT

There are provided a pair of roof rails, a roof panel, a front header, a pair of front pillars, and a pair of center pillars, and a pair of front inclination roof reinforcements provided at a lower face of the roof panel. Each of the front inclination roof reinforcements is configured to extend obliquely from its front portion which is joined to the front header to its rear portion which is positioned on an outward side, in a vehicle width direction, relative to the front portion and joined to a portion located in the vicinity of a joint portion of the center pillar and the roof rail. Thereby, the torsional rigidity of a vehicle body can be properly improved, so that the maneuverability/stability of a vehicle can be improved.

8 Claims, 9 Drawing Sheets

(56) References Cited

U.S. PATENT DOCUMENTS

| | | | | |
|---|---|---|---|---|
| 8,708,390 B2* | 4/2014 | Kurogi | ................... | B62D 25/02 296/203.03 |
| 2004/0080188 A1* | 4/2004 | Igarashi | ................. | B62D 23/00 296/203.04 |
| 2008/0116714 A1* | 5/2008 | Timmermans | ......... | B62D 25/06 296/178 |
| 2008/0169677 A1* | 7/2008 | Hedderly | ............... | B60J 5/0405 296/187.03 |
| 2009/0174229 A1* | 7/2009 | Ordonio | ................ | B62D 25/06 296/216.06 |
| 2010/0045074 A1* | 2/2010 | Friedman | ............... | B62D 25/06 296/210 |
| 2012/0256445 A1* | 10/2012 | Baccouche | ............ | B62D 25/04 296/193.06 |
| 2013/0049392 A1* | 2/2013 | Kurogi | ................... | B62D 25/02 296/30 |
| 2014/0175839 A1* | 6/2014 | Ishigame | ............... | B62D 25/04 296/203.03 |

* cited by examiner

UPPER VEHICLE-BODY STRUCTURE OF VEHICLE

BACKGROUND OF THE INVENTION

The present invention relates to an upper vehicle-body structure of a vehicle comprising a pair of right-and-left roof rails extending in a vehicle longitudinal direction at right-and-left both end portions of a roof portion of a vehicle body, a roof panel provided between the pair of right-and-left roof rails, a front header provided at a front portion of the roof panel in a vehicle width direction, a pair of right-and-left front pillars joined to the roof rails at upper portions thereof and extending downward, and a pair of right-and-left center pillars provided in back of the front pillars, joined to the roof rails at upper portions thereof, and extending downward.

An upper vehicle-body structure of a vehicle comprising a roof panel which forms a roof portion of a vehicle body and a roof reinforcement which is provided below the roof panel to extend in the vehicle width direction is known as exemplified by the upper vehicle-body structures disclosed in Japanese Patent Laid-Open Publication Nos. 2014-58224 and 2002-248943.

The above-described first patent document discloses the upper vehicle-body structure of the vehicle, in which the roof reinforcement is formed in a W shape in the side view such that it has joint faces to be joined to a lower face of the roof panel at its longitudinal-both end portions and its longitudinal-central portion and the other portion of the roof reinforcement than the above-described joint faces is spaced downward apart from the lower face of the roof panel, and this roof reinforcement is joined to the lower face of the roof panel. The structure of the above-described first patent document improves a tensional rigidity of the roof panel (see paragraphs [0038], [0049] of the above-described first patent document).

The above-described second patent document discloses a sunroof structure for a vehicle as the upper vehicle-body structure of the vehicle, in which first and second cross members as the roof reinforcement are arranged in an X shape in the plan view. The X-shaped first and second cross members increase a rigidity of the roof (see paragraph [0027] of the above-described second patent document).

However, the upper vehicle-body structures of the vehicle of the above-described first and second patent documents have been proposed aiming at improving a surface rigidity of the roof itself, not aiming at improving a torsional rigidity of a whole part of the vehicle body. Thus, further work for improvement of the torsional rigidity of the vehicle body has been needed.

SUMMARY OF THE INVENTION

Accordingly, an object of the present invention is to provide an upper vehicle-body structure of a vehicle which can properly improve the torsional rigidity of the vehicle body, thereby improving the maneuverability/stability of the vehicle.

The present invention is an upper vehicle-body structure of a vehicle, comprising a pair of right-and-left roof rails extending in a vehicle longitudinal direction at right-and-left both end portions of a roof portion of a vehicle body, a roof panel provided between the pair of right-and-left roof rails, a front header provided at a front portion of the roof panel in a vehicle width direction, a pair of right-and-left front pillars joined to the roof rails at upper portions thereof and extending downward, a pair of right-and-left center pillars provided in back of the front pillars, joined to the roof rails at upper portions thereof, and extending downward, and a pair of right-and-left front inclination roof reinforcements provided at a lower face of the roof panel, wherein each of the front inclination roof reinforcements is configured to extend obliquely from a front portion thereof which is joined to the front header to a rear portion thereof which is positioned on an outward side, in the vehicle width direction, relative to the front portion and joined to a portion located in the vicinity of a joint portion of the center pillar and the roof rail.

According to the present invention, since respective rigidities of a joint portion of the roof rail and the front header and the joint portion of the center pillar and the roof rail are so improved that deformation is suppressed, the torsional rigidity of the vehicle body can be properly improved, so that the maneuverability/stability of the vehicle can be improved.

Herein, the above-described configuration that the rear portion of the front inclination roof reinforcement is joined to the portion located in the vicinity of the joint portion of the center pillar and the roof rail includes not only a structure in which the rear portion of the front inclination roof reinforcement is joined to the joint portion of the center pillar and the roof rail but another structure in which the rear portion of the front inclination roof reinforcement is joined to an outward end portion, in the vehicle width direction, of a vehicle-body-direction roof reinforcement, which will be described specifically. That is, the above-described vicinity of the joint portion of the center pillar and the roof rail means some area covering the joint portion of the center pillar and the roof rail.

Further, the above-described pair of front inclination roof reinforcements can be configured not only in a roughly inverse-V shape in the plan view such that respective front joint portions of the right-and-left front inclination roof reinforcements to the front header are spaced apart from each other but in an inverse-V shape in the plan view such that the both front joint portions of the right-and-left front inclination roof reinforcements to the front header are positioned substantially at the same point.

In an embodiment of the present invention, the above-described upper vehicle-body structure of the vehicle further comprises a vehicle-width-direction roof reinforcement provided between the pair of roof rails at a position which overlaps with, in the vehicle longitudinal direction, an arrangement position of the center pillar and extending in the vehicle width direction, wherein the rear portion of each of the front inclination roof reinforcements is joined to the vehicle-width-direction roof reinforcement.

According to this embodiment, the rigidity of the joint portion of the center pillar and the roof rail can be further improved.

In another embodiment of the present invention, a partition member is provided inside the front header at a position which does not overlap with, in the vehicle width direction, a joint point of the front inclination roof reinforcement and the front header.

According to this embodiment, improper vertical vibrations of the windshield can be suppressed by cooperation of the front inclination roof reinforcement and the partition member, so that the comfortability of the ride (the vibration damping performance) can be improved with a light structure.

Herein, while it is preferable in improving the comfortability of the ride with the light structure that the partition member be provided inside the front header at a position which does not overlap with, in the vehicle width direction, the joint point of the front inclination roof reinforcement and the front header, the present invention is not limited to this structure but another structure in which the partition member is provided inside the front header at a position which overlaps with, in the vehicle width direction, the joint point of the front inclination roof reinforcement and the front header can be applied.

Herein, the vibration damping performance means the performance aiming at reducing vibrations of the frequency band (mode) of 20-50 Hz (vibrations in which passengers feel shaking with passenger's feet or the like). The vertical vibrations of the front header is one factor of deteriorating the vibration damping performance (the comfortability of the ride), and the present invention can suppress this, thereby achieving the improvement.

In another embodiment of the present invention, the above-described upper vehicle-body structure of the vehicle further comprises a rear header provided at a rear portion of the roof panel in a vehicle width direction, an opening portion formed in back of the rear header, an openable member provided to cover the opening portion, and a pair of right-and-left rear inclination roof reinforcements provided at the lower face of the roof panel, wherein each of the above-described rear inclination roof reinforcements is configured to extend obliquely from a rear portion thereof which is joined to the rear header to a front portion thereof which is positioned on the outward side, in the vehicle width direction, relative to the rear portion and joined to the roof rail.

According to this embodiment, the torsional rigidity of the vehicle body can be further improved, so that the maneuverability/stability of the vehicle can be further improved.

Other features, aspects, and advantages of the present invention will become apparent from the following description which refers to the accompanying drawings.

DETAILED DESCRIPTION OF THE INVENTION

Figure 1:
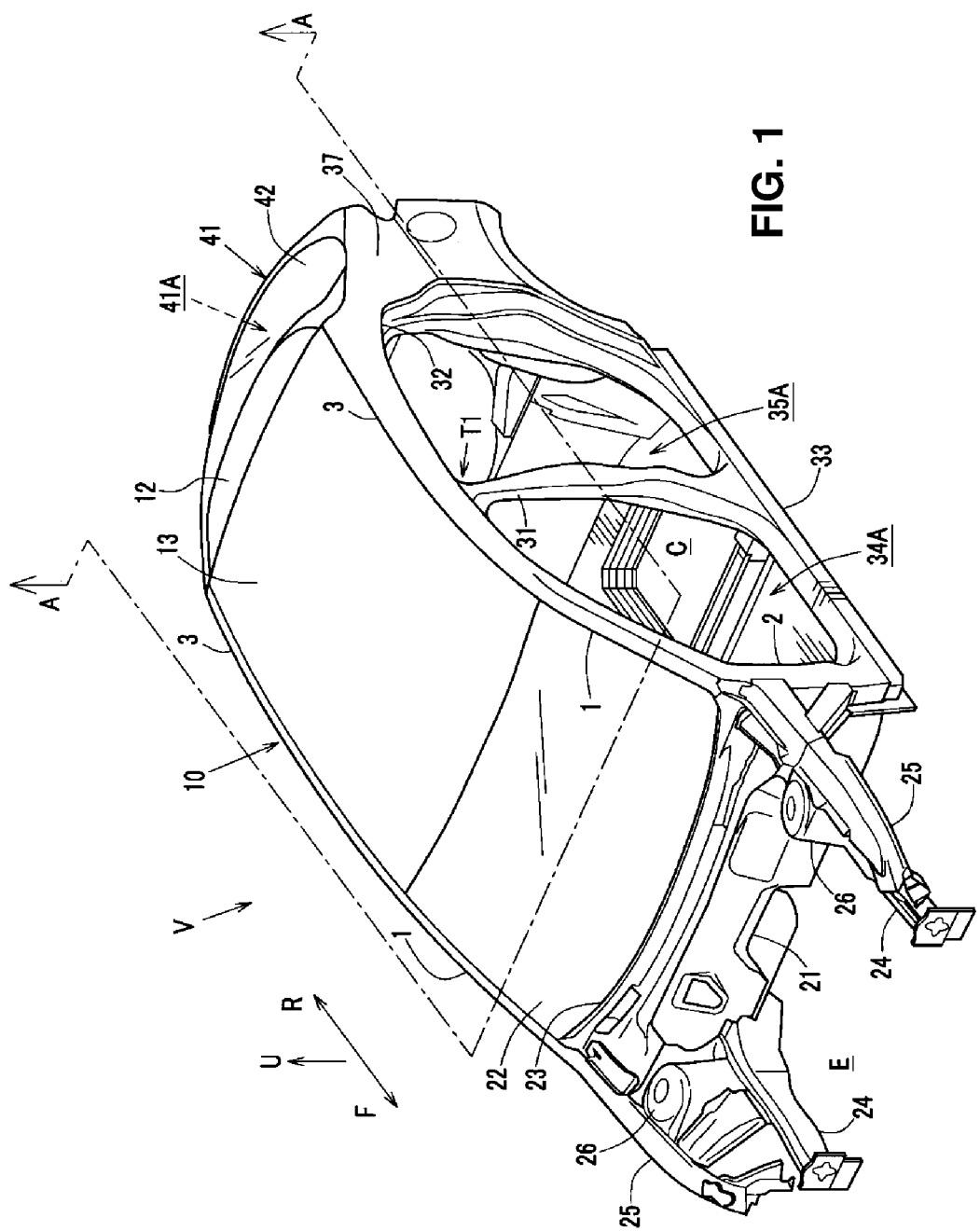
FIG. 1 is a perspective view showing a vehicle according to a first embodiment, omitting illustration of part of the vehicle.

Hereafter, embodiments of the present invention will be described referring to the drawings. FIG. 1 is a perspective view showing a vehicle according to a first embodiment, omitting illustration of part of the vehicle, and FIG. 2 is a perspective view showing a frame structure of the vehicle according to the first embodiment.

Figure 2:
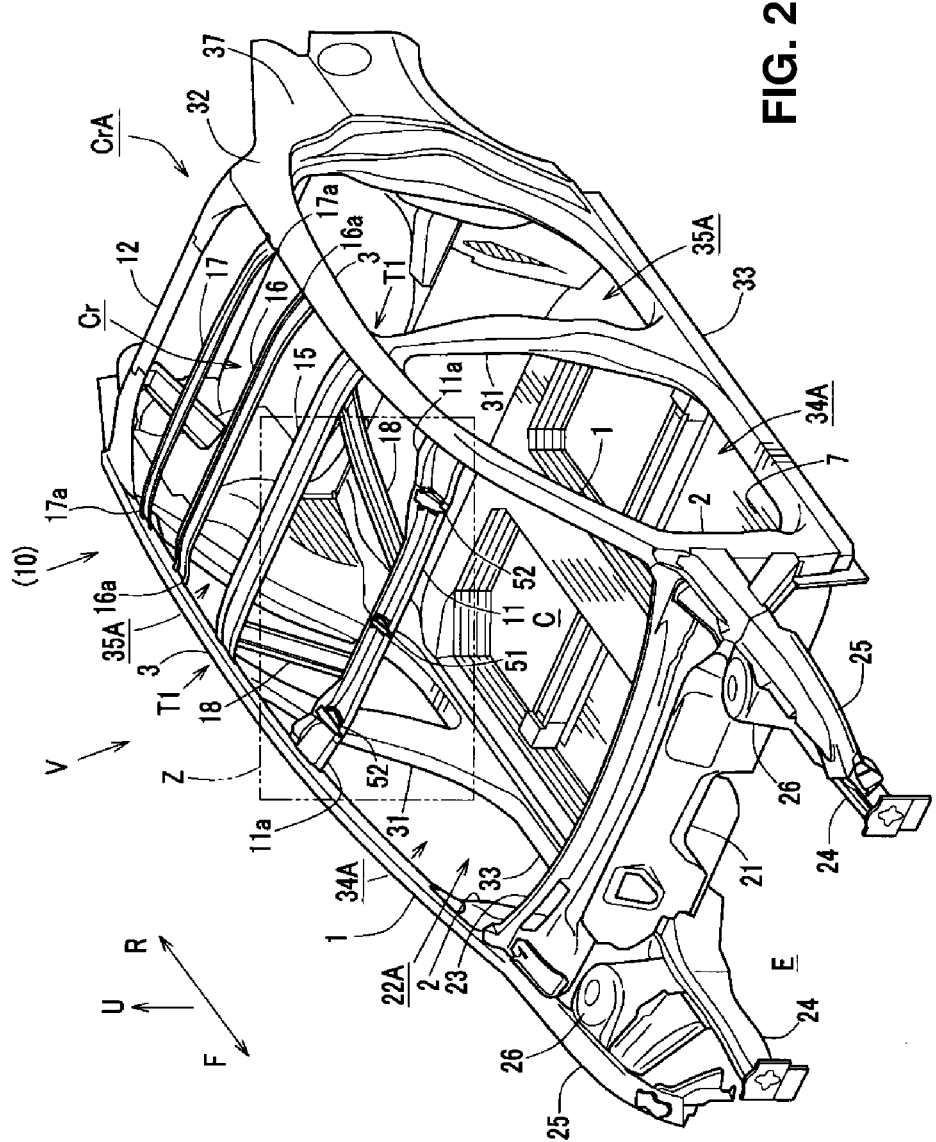
FIG. 2 is a perspective view showing a frame structure of the vehicle according to the first embodiment.
Figure 3:
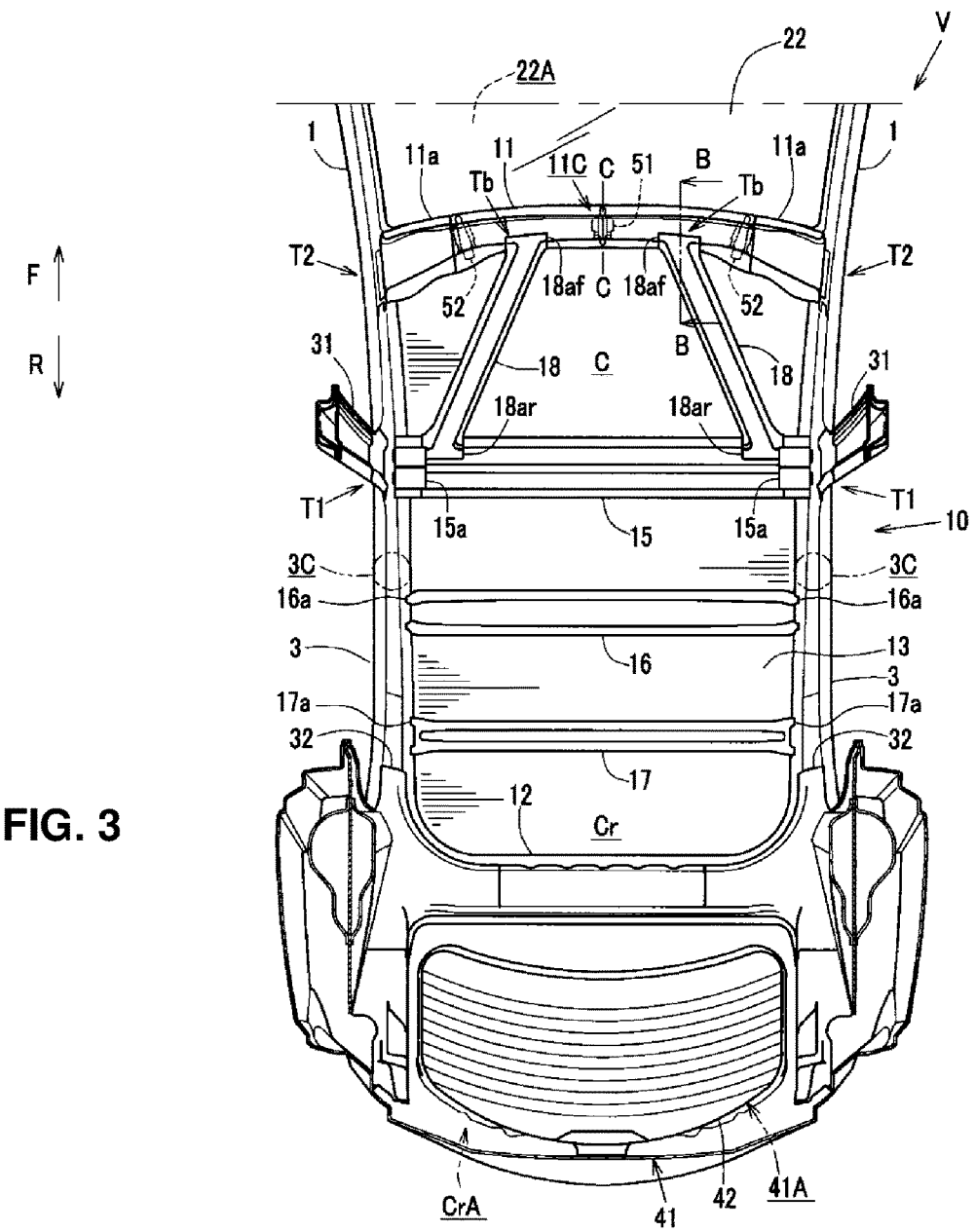
FIG. 3 is a bottom view of an upper vehicle-body structure of the vehicle according to the first embodiment.
Figure 4:
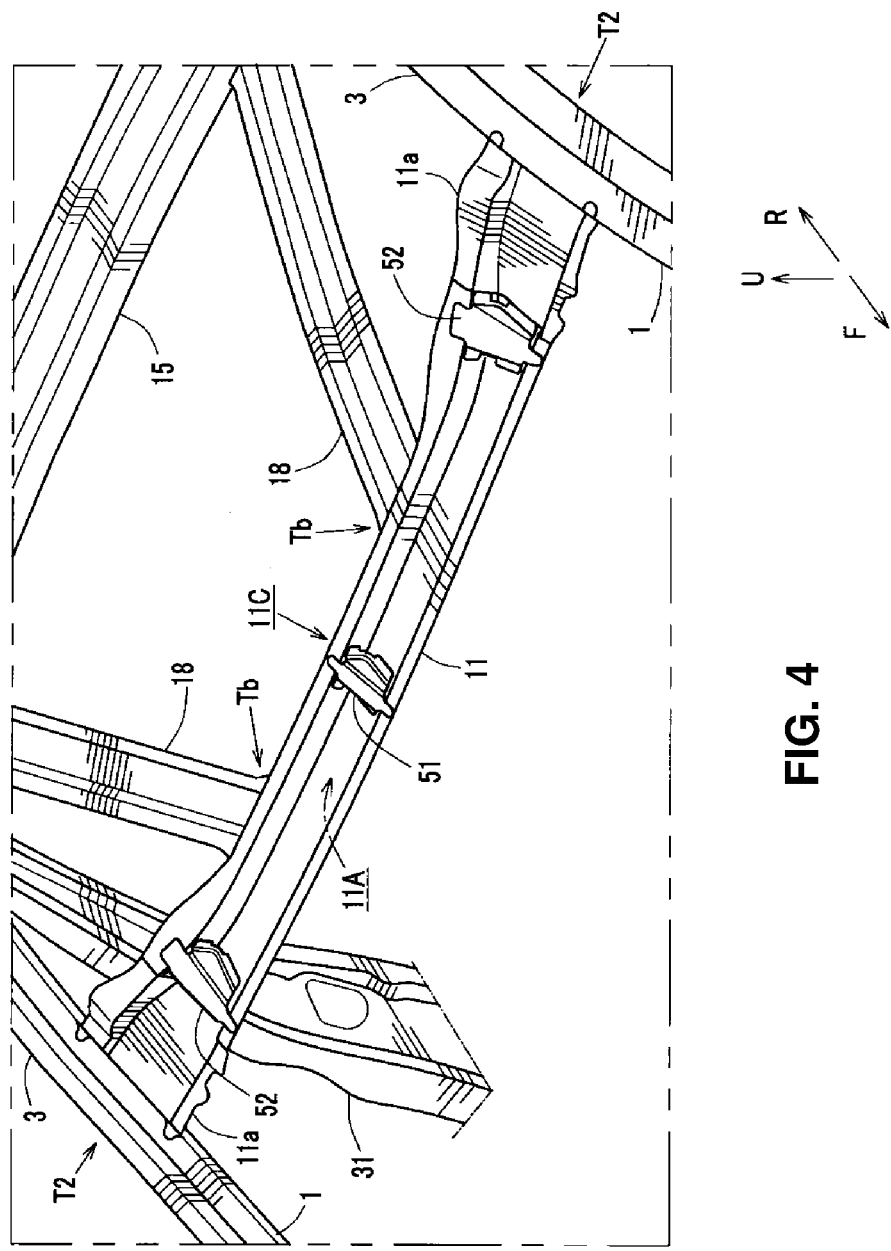
FIG. 4 is a perspective view of a front-side portion of the upper vehicle-body structure of the vehicle according to the first embodiment.
Figure 5A:
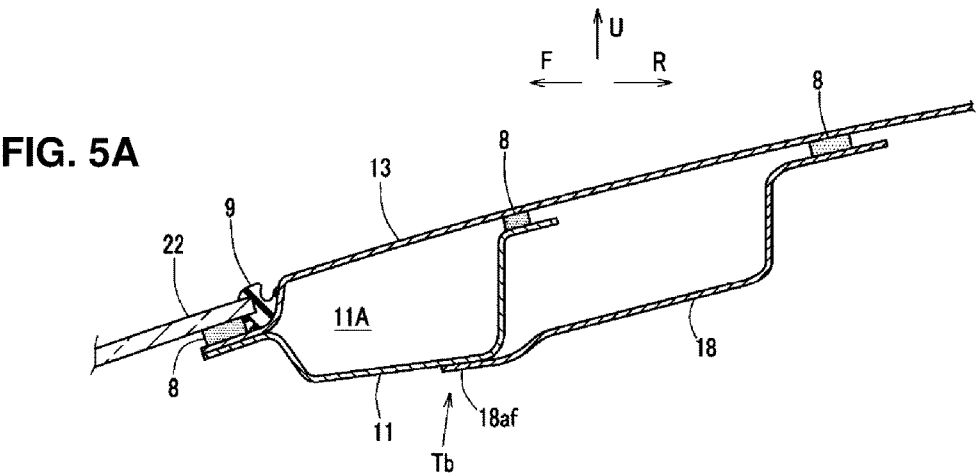
FIGS. 5A and 5B are sectional views showing an inner structure of a front header according to the first embodiment.
Figure 5B:
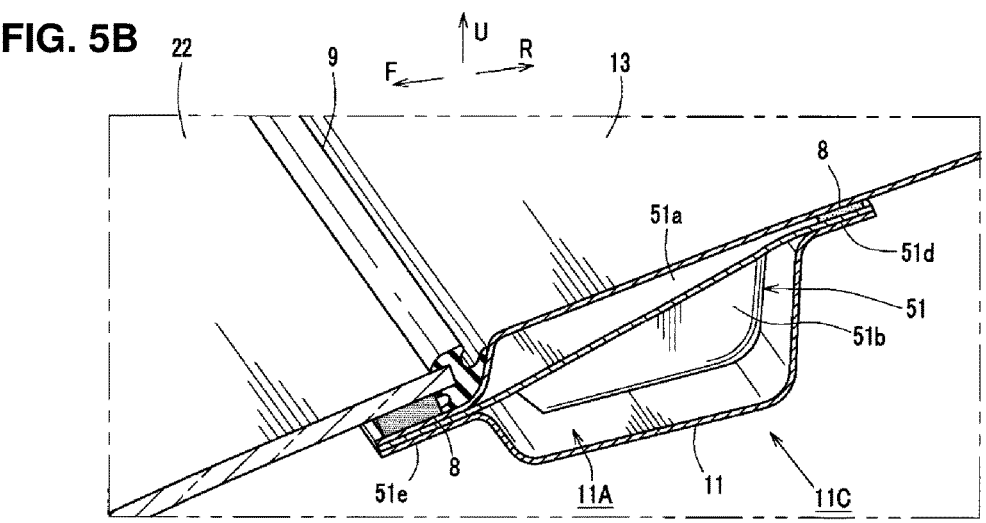
Figure 6:
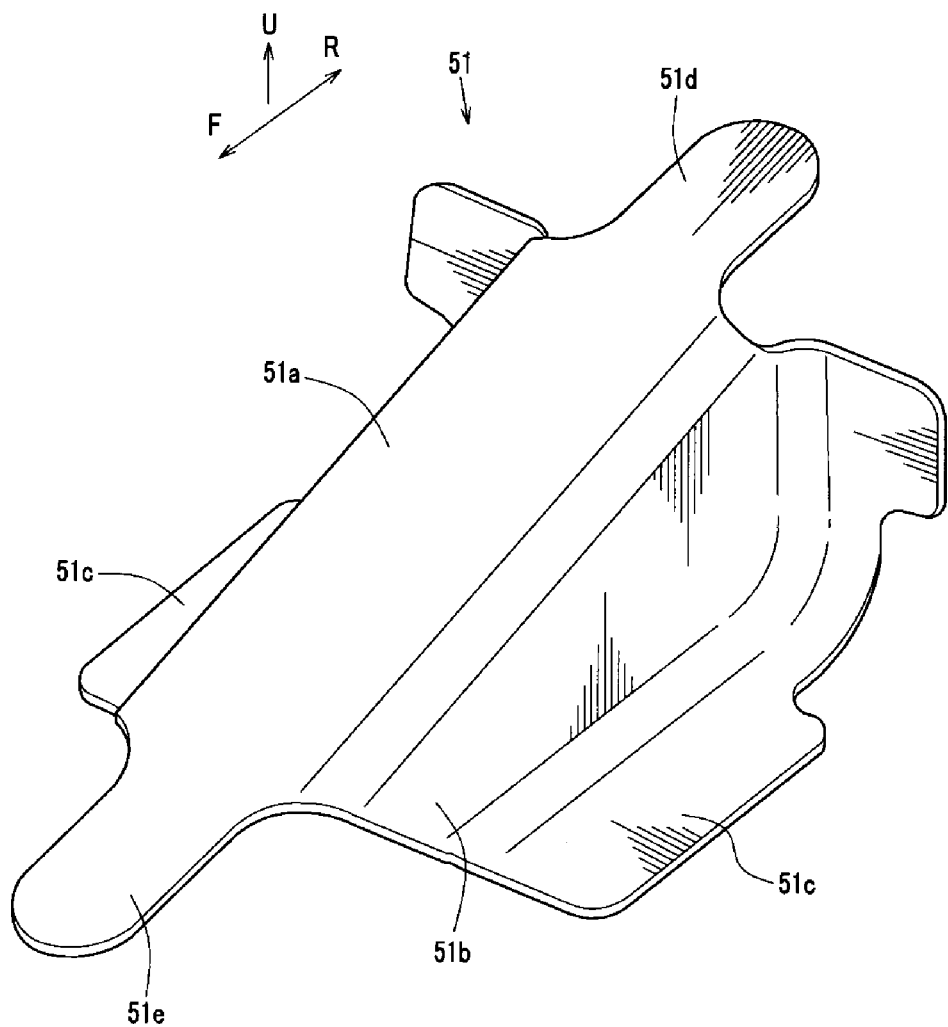
FIG. 6 is a perspective view of a central partition member according to the first embodiment, when viewed obliquely from front, left and upper sides of the vehicle.
Figure 7:
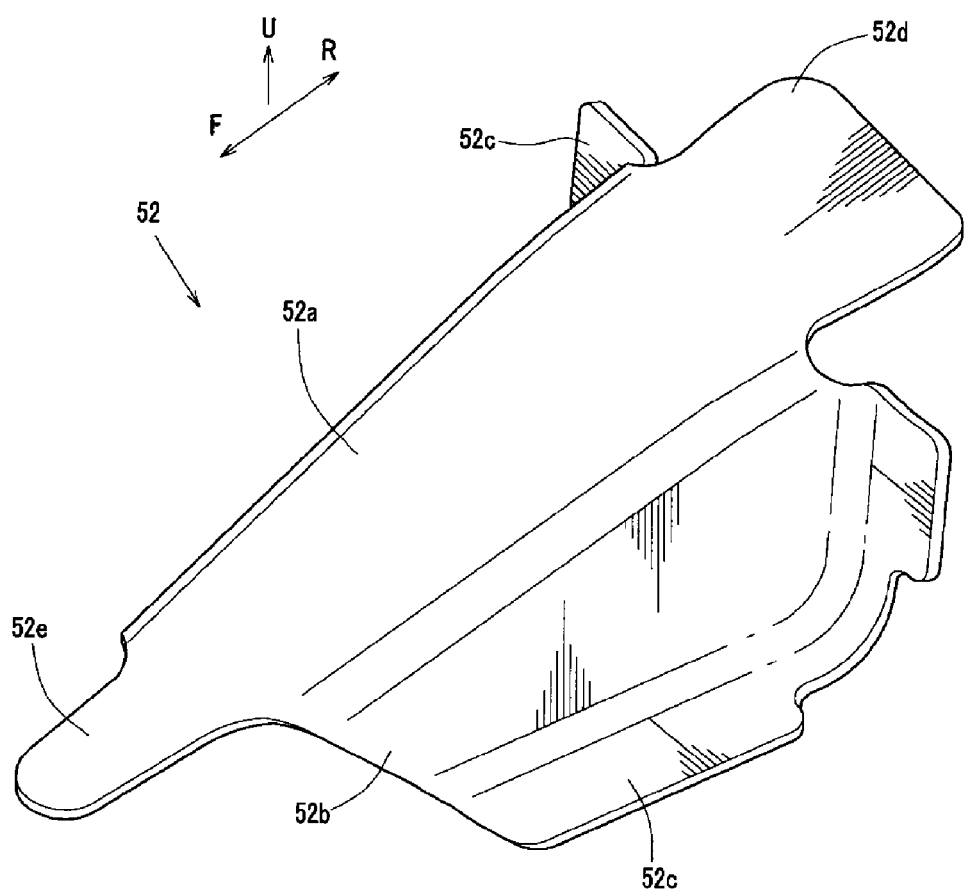
FIG. 7 is a perspective view of an outward partition member according to the first embodiment, when viewed obliquely from the front, left and upper sides of the vehicle.
Figure 8:
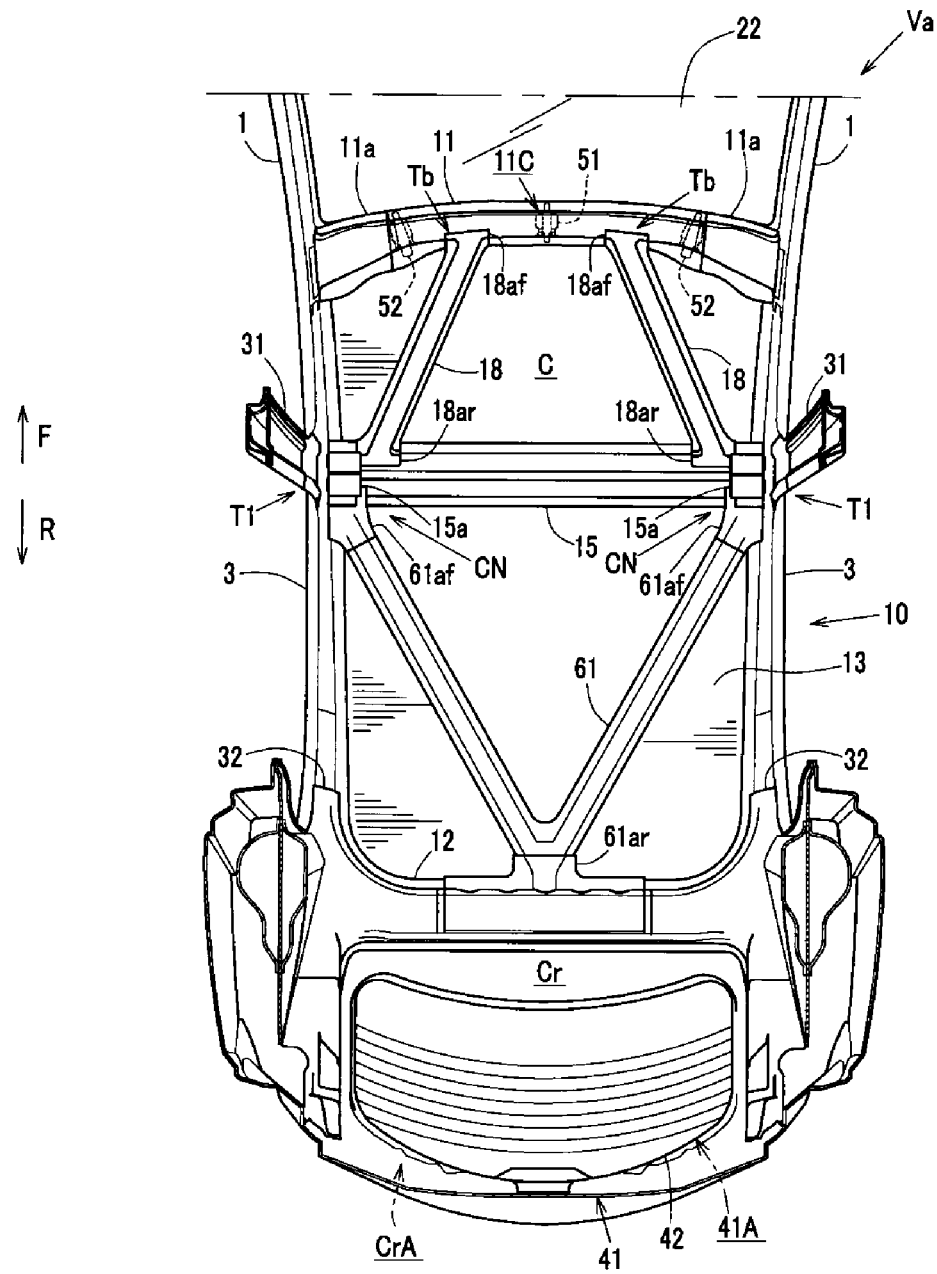
FIG. 8 is a bottom view of an upper vehicle-body structure of the vehicle according to a second embodiment.
Figure 9:
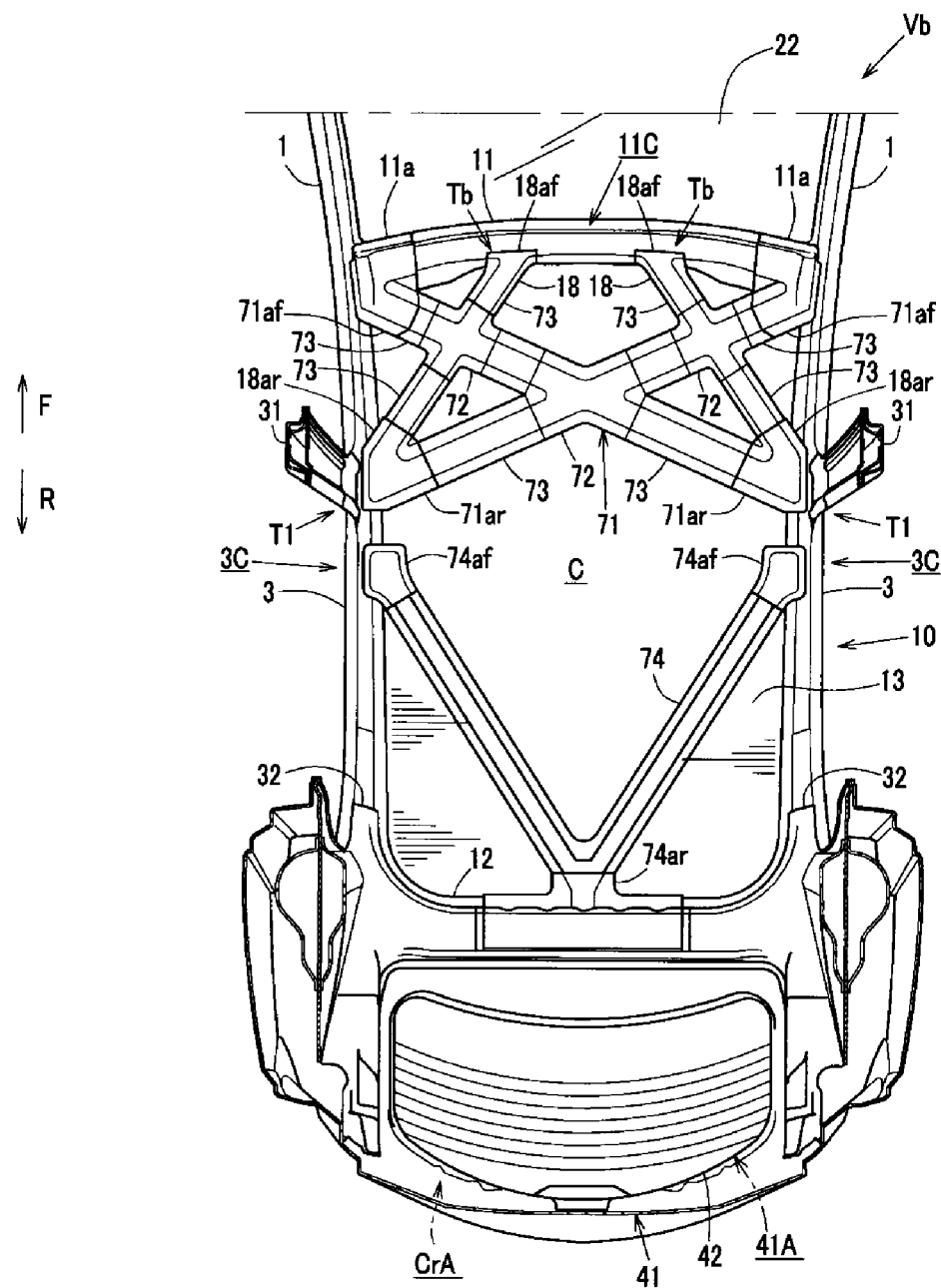
FIG. 9 is a bottom view of an upper vehicle-body structure of the vehicle according to a third embodiment.

FIG. 3 is a view of an upper vehicle-body structure of the vehicle according to the first embodiment, when viewed from a bottom face, which is a sectional view taken along line A-A of FIG. 1. FIG. 4 is an enlarged view of a front-side portion of the upper vehicle-body structure of the vehicle in an area Z of FIG. 2. FIG. 5A is a sectional view taken along line B-B of FIG. 3, and FIG. 5B is a sectional view taken along line C-C of FIG. 3, when viewed obliquely from front, left and upper sides of the vehicle. FIG. 6 is a perspective view of a central partition member according to the first embodiment, when viewed obliquely from the front, left and upper sides of the vehicle, and FIG. 7 is a perspective view of an outward partition member according to the first embodiment, when viewed obliquely from the front, left and upper sides of the vehicle. FIG. 8 is a view of an upper vehicle-body structure of the vehicle according to a second embodiment, when viewed from a bottom face, which is a sectional view corresponding to the sectional view taken along line A-A of FIG. 1. FIG. 9 is a view of an upper vehicle-body structure of the vehicle according to a third embodiment, when viewed from a bottom face, which is a sectional view corresponding to the sectional view taken along line A-A of FIG. 1. In the figures, an arrow F shows a front side of a vehicle body, an arrow R shows a rear side of the vehicle body, and an arrow U shows an upper side of the vehicle body.

Embodiment 1

As shown in FIGS. 1 and 2, a pair of front pillars 1, 1 which extend obliquely upward and rearward from a lower portion of a front side at both sides, in a vehicle width direction, of a vehicle are provided at an upper portion of a vehicle V according to a first embodiment. And, respective lower portions of the front pillars 1, 1 connect to a pair of hinge pillars 2, 2 which extend in a vertical direction.

The front pillar 1 is a vehicle-body rigidity member having a closed cross section, which is formed by joining a front pillar inner and a front pillar outer, and also the hinge pillar 2 is another vehicle-body rigidity member having a closed cross section, which is formed by joining a hinge pillar inner and a hinge pillar outer.

As shown in FIGS. 1-3, a pair of right-and-left roof rails 3, 3 (roof side rails) which extend in a vehicle longitudinal direction, respectively, are provided to connect to rear ends of the above-described right-and-left front pillars 1, 1, a front header 11 which extends in the vehicle width direction (see FIGS. 2 and 3) is provided between respective upper end portions of the right-and-left front pillars 1, 1, and a rear header 12 which extends in the vehicle width direction is provided between respective rear end portions of the right-and-left roof rails 3, 3.

As shown in FIGS. 2, 3 and 4, joint flanges 11a are joined to both end portions, in the vehicle width direction, of the front header 11, and the front header 11 is joined (fixedly joined) to the roof rails via the joint flanges 11a. Herein, the joint flange 11a is configured such that its inward end has substantially the same width (a length of the vehicle longitudinal direction) as the front header 11 and also its outward portion has a wider width (see FIGS. 3 and 4).

An area which is enclosed by the pair of right-and-left roof rails 3, 3, the front header 11, and the rear header 12 is covered with a steel-made roof panel 13 which is provided at the upper portion of the vehicle to expand in the vehicle longitudinal direction and in the vehicle width direction (see FIGS. 1 and 3).

The roof panel 13 is arranged to cover over at least part of the front header 11 and the rear header 12 in addition to the above-described area. Accordingly, the front header 11 and the rear header 12 form a roughly closed-cross section structure together with the roof panel 13 arranged above these headers 11, 12, which are vehicle-body rigidity members extending in the vehicle width direction that are provided at a front portion and a rear portion of the roof panel 13, respectively.

The closed-cross section structure of the front header 11 will be described specifically. The front header 11 is, as shown in FIGS. 5A and 5B, configured to have a cross section which has a roughly hat shape opening upward. Therefore, a closed-cross section space 11A is formed between the front header 11 and the roof panel 13 which covers over an upper opening of the front header 11. In FIGS. 5A and 5B, reference character 9 denotes a seal member.

Further, as shown in FIGS. 1-3, a center pillar 31 which extends in the vertical direction is provided to connect to a portion of the roof rail 3 extending in the vehicle longitudinal direction which is positioned in front of a central portion, in the vehicle longitudinal direction, of the roof rail 3 (a circle point 3C shown by a two-dotted broken line in FIG. 3), and a rear pillar 32 which extends in the vertical direction is provided to connect to a rear end portion of the roof rail 3.

Meanwhile, as shown in FIGS. 1 and 2, a side sill 33 which extends rearward from a lower portion of the hinge pillar 2 is provided at a lower portion of the vehicle, and a lower portion of the center pillar 31 extending in the vertical direction is joined to a central portion, in the vehicle longitudinal direction, of the side sill 33.

Further, at a front portion of the vehicle is provided a dash panel 21 which is configured to rise from a front end of a floor panel 7 and extend in the vehicle width direction over a roughly whole width of the vehicle so as to partition a cabin C from an engine room E. Above this dash panel 21 is provided a cowl panel 23 which extends in the vehicle width direction so as to support a lower end of a windshield 22 (see the same figures). In FIGS. 1 and 2, reference character 24 denotes a pair of right-and-left front side frames which extend in the vehicle longitudinal direction at both sides of the engine room E positioned in front of the dash panel 21, reference character 25 denotes a pair of right-and-left apron reinforcements which extend forward from respective upper end portions of the hinge pillars 2 at positions which are spaced upward and outward apart from the pair of right-and-left front side frames 24, and reference character 26 denotes a pair of right-and-left suspension tower portions which are provided on the both sides, in the vehicle width direction, of the engine room E.

As shown in FIG. 2, the vehicle V has a windshield opening portion 22A which is enclosed by the front header 11, the right-and-left front pillars 1, 1, and the cowl panel 23, a front-side side door opening 34A which is enclosed by the hinge pillar 2, the front pillar 1, a front portion of the roof rail 3, the center pillar 31, and the side sill 33, and a rear-side side door opening 35A which is enclosed by the center pillar 31, a rear portion of the roof rail 3, the rear pillar 32, a rear body side portion 37 including a rear fender, and the side sill 33. The wind shield 22 is arranged at the windshield opening portion 22A (see FIGS. 1 and 3), a front side door, not illustrated, is openably arranged at the front-side door opening 34A, and a rear side door, not illustrated, is openably arranged at a rear-side door opening 35A.

Meanwhile, a rear baggage-room opening CrA which opens rearward from a rear baggage room Cr positioned behind the cabin C is formed at a vehicle rear portion (see FIGS. 2 and 3), and as shown in FIGS. 1 and 3, this rear baggage-room opening CrA is covered with a lift gate 41 (back door) with a pivotal point provided at a rear end (a portion of the rear header 12) of the roof panel 13. Thus, a hatchback type of vehicle is configured. The lift gate 41 has a lift-gate opening portion 41A, where a rear window 42 is openably provided (see FIGS. 1 and 3).

Further, as shown in FIGS. 2 and 3, plural roof reinforcements 15-18 are provided between the front header 11 and the rear header 12 below the roof panel 13 (on the side of the cabin C), and a roof portion 10 is formed by the roof panel 13, the front header 11, the rear header 12, and the plural roof reinforcements 15-18 (see FIGS. 1 and 3).

An adhesive agent 8 is added on upper faces of the front header 11, the rear header 12, and the roof reinforcements 15-18 (see FIGS. 5A and 5B, for example), which are made to adhere to a lower face of the roof panel 13 by means of this adhesive agent 8.

Further, as shown in FIGS. 2 and 3, the above-described plural roof reinforcements 15-18 comprise the front-side vehicle-width-direction roof reinforcement 15, the rear-side first vehicle-width-direction roof reinforcement 16, the rear-side second vehicle-width-direction roof reinforcement 17, and the front inclination roof reinforcements 18.

The front-side vehicle-width-direction roof reinforcement 15 extends straightly in the vehicle width direction between the pair of right-and-left roof rails 3, 3, joint flanges 15a are respectively joined to both outward end portions, in the vehicle width direction, of this reinforcement 15 as shown in FIG. 3, and the front-side vehicle-width-direction roof reinforcement 15 is joined to the roof rails 3 via the joint flanges 15a at each position which at least partially overlaps with, in the vehicle longitudinal direction, an arrangement position of the center pillar 31.

Also, the rear-side first vehicle-width-direction roof reinforcement 16 and the rear-side second vehicle-width-direction roof reinforcement 17 have, as shown in FIGS. 2 and 3, joint pieces 16a, 17a which are integrally formed at their both end portions, respectively. These joint pieces 16a, 17a are joined to respective longitudinal points of the roof rails 3, 3 by spot welding or the like, so that these reinforcements 16, 17 are joined to the roof rails 3, 3.

Thus, the rear-side first vehicle-width-direction roof reinforcement 16 is provided to interconnect the roof rails 3, 3 at a position located slightly in back of the roughly central portion 3C (see FIG. 3), in the vehicle longitudinal direction, of the roof rails 3, 3, and the rear-side second vehicle-width-direction roof reinforcement 17 is provided at a roughly central position, in the vehicle longitudinal direction, between the rear-side first vehicle-width-direction roof reinforcement 16 and the rear header 12.

Further, the above-described front inclination roof reinforcements 18 are configured as a pair of members which are arranged side by side in the vehicle width direction as shown in FIGS. 2 and 3, and their front portions are joined to the front header 11. Each of these reinforcements 18, 18 extends obliquely rearward and outward. In the present embodiment, the pair of right-and-left front inclination roof reinforcements 18, 18 are configured in a roughly inverse-V shape in the plan view such that their front portions are spaced apart from each other and a lateral (i.e., vehicle width directional) distance therebetween becomes gradually wider toward the vehicle rear side (see FIG. 3). Each of the rear portions of the right-and-left front inclination roof reinforcements 18, 18 is joined to a portion located in the vicinity of a joint portion T1 of the center pillar 31 and the roof rail 3 (see FIGS. 2 and 3).

Specifically, joint flanges 18*af*, 18*ar* (the front-end joint flange 18*af* and the rear-end joint flange 18*ar*) are integrally formed at front-and-rear both end portions of the pair of right-and-left front inclination roof reinforcements 18, 18 as shown in FIG. 3. And, as shown in FIGS. 3 and 4, the front-end joint flange 18*af* of the left-side front inclination roof reinforcement 18 is joined to a portion of the front header 11 between the central portion 11C and the left-side outward end portion (the left-side joint flange 11*a*) (see FIG. 5A), and the front-end joint flange 18*af* of the right-side front inclination roof reinforcement 18 is joined to a portion of the front header 11 between the central portion 11C and the right-side outward end portion (the right-side joint flange 11*a*).

Further, on each side, in the vehicle width direction, of the vehicle, the rear-end joint flange 18*ar* of the front inclination roof reinforcement 18 is joined substantially to the same position as the joint flange 15*a* at the outward end portion, in the vehicle width direction, of the front-side vehicle-width-direction roof reinforcement 15, or to a position located slightly inward from the joint flange 15*a*.

Herein, as shown in FIGS. 2 and 4, partition members 51, 52 are provided inside the closed-cross section space 11A of the front header 11 (see FIGS. 5A and 5B) at positions which do not overlap with, in the vehicle width direction, the joint points of the front inclination roof reinforcements 18 and the front header 11.

Specifically, as shown in FIG. 4, the partition members 51, 52 comprise the single central partition member 51 and the two outward partition members 52, which are arranged inside the closed-cross section space 11A of the front header 11. The central partition member 51 is positioned at the central portion 11C, in the vehicle width direction, of the front header 11 (see FIGS. 3, 4 and 5B), and the outward partition members 52 are arranged at both outward portions, in the vehicle width direction, of the front header 11, i.e., at both base portions of the front header 11 (see FIGS. 3 and 4).

Specifically, the central partition member 51 is formed as shown in FIG. 6, and the outward partition member 52 is formed in FIG. 7. These members 51, 52 respectively comprise slant upper faces 51*a*, 52*a* which slant rearward and upward, pairs of right-and-left side wall portions 51*b*, 52*b* which extend downward from both sides, in the vehicle width direction, thereof, side flange portions 51*c*, 52*c* which extend outward from a lower end and a rear end of the side wall portions 51*b*, 52*b*, rear flange portions 51*d*, 52*d* which protrude rearward and upward from rear ends of the slant upper faces 51*a*, 52*a*, and front flange portions 51*e*, 52*e* which protrude forward and downward from front ends of the slant upper faces 51*a*, 52*a*, which are formed integrally.

Further, the central partition member 51 is, as shown in FIG. 6, configured such that the width (length of the vehicle width direction) of the slant upper face 51*a* is substantially constant along the vehicle longitudinal direction. Meanwhile, the outward partition member 52 is, as shown in FIG. 7, configured such that the width of the slant upper face 52*a* becomes wider toward the vehicle rear and the rear flange portion 52*d* protruding from the rear end of the wide slant upper face 52*a* has a wider width than the rear flange portion 51*d* of the central partition member 51.

Thus, the central partition member 51 and the outward partition member 52 are formed substantially in the same shape, but they are formed differently so as to correspond to each space and shape of their arrangement locations, in the vehicle width direction, of the front header 11.

As described above, the upper vehicle-body structure of the vehicle V of the first embodiment specifically described above comprises the pair of right-and-left roof rails 3, 3 extending in the vehicle longitudinal direction at the right-and-left both end portions of the roof portion 10 of the vehicle body, the roof panel 13 provided between the pair of right-and-left roof rails 3, 3, the front header 11 provided at the front portion of the roof panel 13 in the vehicle width direction, the pair of right-and-left front pillars 1, 1 joined to the roof rails 3, 3 at the upper portions thereof and extending downward, the pair of right-and-left center pillars 31, 31 provided in back of the front pillars 1, 1, joined to the roof rails 3, 3 at the upper portions thereof, and extending downward, and the pair of right-and-left front inclination roof reinforcements 18, 18 provided at the lower face of the roof panel 13, wherein each of the front inclination roof reinforcements 18, 18 is configured to extend obliquely from the front portion thereof (the front end joint flange 18*af*) which is joined to the front header 11 to the rear portion thereof (the rear end joint flange 18*ar*) which is positioned on the outward side, in the vehicle width direction, relative to the front portion and joined to the portion located in the vicinity of the joint portion T1 of the center pillar 31 and the roof rail 3 (see FIGS. 2 and 3).

According to this structure, since the rigidity of the joint portion T2 (see FIGS. 3 and 4) of the roof rail 3, the front header 11, and the front pillar 1 and the rigidity of the joint portion T1 of the center pillar 31 and the roof rail 3 are so improved that deformation is suppressed, the torsional rigidity of the vehicle body can be properly improved, so that the maneuverability/stability of the vehicle can be improved.

Specifically, according to the above-described structure, the front inclination roof reinforcement 18 can improve the rigidity of the joint portion T2 of the roof rail 3, the front header 11, and the front pillar 1 and the rigidity of the joint portion T1 of the center pillar 31 and the roof rail 3 by configuring it to extend obliquely from the front portion thereof (the front end joint flange 18*af*) which is joined to the front header 11 to the rear portion thereof (the rear end joint flange 18*ar*) which is positioned on the outward side, in the vehicle width direction, relative to the front portion and joined to the portion located in the vicinity of the joint portion T1 of the center pillar 31 and the roof rail 3, so that not only improving of the rigidity of the flat-face shaped roof portion 10 but suppressing of the torsional deformation of frame works of the three-dimensional vehicle body including the center pillar 31 and surroundings of the roof portion 10 can be achieved by the above-described front inclination roof reinforcement 18.

Accordingly, the vehicle body's torsional rigidity can be improved and the maneuverability/stability of the vehicle can be improved.

In the embodiment of the present invention, there is further provided the front-side vehicle-width-direction roof reinforcement 15 as the vehicle-width-direction roof reinforcement provided between the pair of roof rails 3, 3 at the position which overlaps with, in the vehicle longitudinal direction, the arrangement position of the center pillar 31 and extending in the vehicle width direction, wherein each of the rear portions of the front inclination roof reinforcements 18, 18 is joined to the front-side vehicle-width-direction roof reinforcement 15 (see FIGS. 2 and 3).

Thus, by joining the rear portion (the rear-end joint flange 18*ar*) of the front inclination roof reinforcement 18 to the front-side vehicle-width-direction roof reinforcement 15 extending in the vehicle width direction between the pair of roof rails 3, 3 at the position which overlaps with, in the vehicle longitudinal direction, the arrangement position of the center pillar 31, the rigidity of the joint portion T1 of the center pillar 31 and the roof rail 3 can be further improved.

Further, in the embodiment of the present invention, there are provided the central partition member 51 and the outward partition member 52 as the partition members 51, 52 which are provided inside the front header 11 at the positions which do not overlap with, in the vehicle width direction, the joint point Tb (see FIGS. 3, 4, and 5A) of the front inclination roof reinforcement 18 and the front header 11 (see FIGS. 3, 4 and 5B).

According to this structure, improper vertical vibrations of the windshield 22 can be suppressed by cooperation of the front inclination roof reinforcement 18 and the partition members 51, 52, so that the comfortability of the ride (the vibration damping performance) can be improved with a light structure.

Moreover, in the upper vehicle-body structure of the vehicle V of the first embodiment, the front inclination roof reinforcements 18, 18 can be simply made of straightly-extending frames without any cross portions by configuring the front inclination roof reinforcements 18, 18 in the roughly inverse-V shape in the plan view such that their front portions are spaced apart from each other and the lateral (i.e., vehicle width directional) distance therebetween becomes gradually wider toward the vehicle rear side (see FIGS. 2 and 3).

Likewise, since the front-side vehicle-width-direction roof reinforcement 15 is made of a frame straightly extending in the vehicle width direction without any cross portion in the upper vehicle-body structure of the vehicle V of the first embodiment, the productivity of the reinforcement can be superior (see FIGS. 2 and 3).

Moreover, since the upper vehicle-body structure of the vehicle V of the first embodiment is provided with the front-side vehicle-width-direction roof reinforcement 15, the safety performance against the vehicle side collision can be improved.

Additionally, in the upper vehicle-body structure of the vehicle V of the first embodiment, the rear-side first vehicle-width-direction roof reinforcement 16 and the rear-side second vehicle-width-direction roof reinforcement 17 which both extend in the vehicle width direction are provided between the front-side vehicle-width-direction roof reinforcement 15 and the rear header 12, so that the tensional rigidity of a rear-side portion of the roof panel 13 can be improved (see the same figures).

Next, a second embodiment will be described. Herein, the same structures as the above-described first embodiment are denoted by the same reference characters, descriptions of which are omitted.

Embodiment 2

A vehicle Va of the second embodiment comprises, as shown in FIG. 8, a pair of right-and-left rear inclination roof reinforcements 61 which are, as shown in FIG. 8, configured such that their rear portions are joined to the rear header 12 and they extend obliquely forward and outward, in place of the rear-side first vehicle-width-direction roof reinforcement 16 and the rear-side second vehicle-width-direction roof reinforcement 17 which the vehicle V of the first embodiment comprises.

Specifically, the rear inclination roof reinforcements 61 are configured such that their rear portions are joined together to a central portion, in the vehicle width direction, of the rear header 12 via a rear-end flange portion 61*ar*, and configured in a roughly V shape in the plan view such that the lateral distance thereof becomes larger toward the vehicle front.

Moreover, as shown in FIG. 8, respective front portions of the rear inclination roof reinforcements 61 are joined to the roof rails 3 at a position between the center pillar 31 and the rear header 12 (see the same figure).

Specifically, the both-side front portions of the rear inclination roof reinforcements 61 are joined to the both-side roof rails 3 via front-end flange portions 61*af* at respective positions near both-side corner portions CN which are formed by the front-side vehicle-width-direction roof reinforcements 15 and the both-side roof rails 3.

According to the above-described structure, since the rear portions of the rear inclination roof reinforcements 61 extending obliquely forward and outward are joined to the rear header 12 (see the same figure), deformations of the rear baggage-room opening CrA and the lift-gate opening portion 41A are so suppressed that the vehicle-body torsional rigidity can be improved and the maneuverability/stability of the vehicle can be improved.

Further, since the front portions of the rear inclination roof reinforcements 61 are joined to the roof rails 3 at the position between the center pillar 31 and the rear header 12 as described above (see the same figure), deformation of the rear-side side door opening 35A (see FIG. 2) can be suppressed, so that the vehicle-body torsional rigidity can be more improved and the maneuverability/stability of the vehicle can be more improved.

Also, since the front portions of the rear inclination roof reinforcements 61 are joined to the both-side roof rails 3 at the positions near the corner portions CN formed by the front-side vehicle-width-direction roof reinforcements 15 and the roof rails 3 (see the same figure), deformation of a portion of the roof panel 13 which is enclosed by the both-side roof rails 3, 3, the front-side vehicle-width-direction roof reinforcement 15, and the rear header 12 can be suppressed (i.e., the surface rigidity of the roof panel 13 can be ensured), so that the vehicle-body torsional rigidity can be further improved and the maneuverability/stability of the vehicle can be further improved.

Embodiment 3

A vehicle Vb of the third embodiment comprises, as shown in FIG. 9, a front-side cross-shaped roof reinforcement 71 which is configured to extend in the vehicle width direction in a cross shape in the plan view between the pair of right-and-left roof rails 3, 3, in place of the front-side vehicle-width-direction roof reinforcement 15 extending straightly in the vehicle width direction (see FIG. 3) which the vehicle V of the first embodiment comprises.

The front-side cross-shaped roof reinforcement 71 is configured in the cross shape to have a cross portion which is located at a roughly central position, in the vehicle width direction, of the vehicle body and also at a roughly middle position, in the vehicle longitudinal direction, between the front header 11 and the hinge pillar 2, and to have rightand-left cross portions which are located where this reinforcement 71 crosses a pair of front inclination roof reinforcements 18.

The front-side cross-shaped roof reinforcement 71 comprises cross frames 72 provided at the above-described cross portions and straight frames 73 provided at other part than the cross portions, which are formed integrally (see FIG. 9).

The front-side cross-shaped roof reinforcement 71 described above has joint flanges 71af, 71ar (front-end joint flanges 71af, rear-end joint flanges 71ar) at a front portion and a rear portion of both sides, in the vehicle width direction, thereof, and is joined to the roof rails 3 via these joint flanges 71af, 71ar (see the same figure).

Specifically, as shown in FIG. 9, the front-side cross-shaped roof reinforcement 71 is configured such that the both-side rear-end joint flanges 71ar are joined to the corresponding side roof rails 3 at respective positions which overlap with the center pillars 31 in the vehicle longitudinal direction, and the both-side front-end joint flanges 71af are joined to the corresponding roof rails 3 at respective positions which are located near the corner portions formed by the front header 11 and the roof rails 3. Meanwhile, like the rear inclination roof reinforcements 61 of the second embodiment, the vehicle Vb of the third embodiment is equipped with a pair of rear inclination roof reinforcements 74, which are provided, in the vehicle longitudinal direction, between the center pillar 31 and the rear header 12 and configured such that each rear portion is joined to the rear header 12 via a rear-end flange 74ar and in a roughly V shape in the plan view such that the lateral distance thereof becomes larger toward the vehicle front. Herein, respective front portions of the rear inclination roof reinforcements 74 are joined to the corresponding roof rails 3 at the respective roughly central portion 3C, in the vehicle longitudinal direction, of the roof rails 3 (the central position 3C between the front header 11 and the rear header 12) (see FIG. 9).

Herein, while the vehicle Vb of the third embodiment does not have the above-described partition members 51, 52 inside the closed-cross section space 11A of the front header 11 (see FIG. 9), there may be provided these members 51, 52 like the vehicles V, Va of the other embodiments.

According to the vehicle Vb of the third embodiment, since the front-side cross-shaped roof reinforcement 71 is provided, additionally to the roughly-V shaped front inclination roof reinforcements 18, 18 configured in the roughly inverse-V shape in the plan view such that their front portions are spaced apart from each other and the lateral distance therebetween becomes gradually wider toward the vehicle rear side, the rigidities of the joint portions of the roof rails 3 and the respective pillars (the front pillars 1 and the center pillars 31) can be improved further, so that the torsion of the vehicle-body frame structure is so suppressed that the vehicle-body torsional rigidity can be further improved.

Moreover, since the roughly central portion 3C, in the vehicle longitudinal direction, of the roof panel 13 is poisoned closer to the center, in the vehicle longitudinal direction, of the rear-side door opening 35A than the corner portion CN formed by the front-side vehicle-width-direction roof reinforcement 15 and the roof rail 3 (see FIG. 9), deformation of the rear-side side door opening 35A can be suppressed and the vehicle-body torsional rigidity can be improved by joining the front portions of the rear inclination roof reinforcements 74 to the roof rails 3 via the front-end flanges 74af at the roughly central portions 3C, in the vehicle longitudinal direction, of the roof panel 13. Consequently, the maneuverability/stability of the vehicle can be improved.

In correspondence of the present invention to the above-described embodiments, the vehicle-width-direction roof reinforcement of the present invention corresponds to the front-side roof reinforcement 15 of the first and second embodiments or the front-side cross-shaped roof reinforcement 71 of the third embodiment. Likewise, the partition member corresponds to the central partition member 51 and the outward partition member 52. However, the present invention is not to be limited to the above-described embodiments.

For example, while the partition members 51, 52 are provided inside the close-cross section space 11A of the front header 11 in the vehicles V, Va of the first and second embodiments of the present invention (see FIG. 4), the present invention may be configured such that at least one of the central partition member 51 and the outward partition member 52 is provided. Further, while it is effective to provide the partition members 51, 52 in properly suppressing the vertical vibrations of the windshield 22 to improve the comfortability of the ride (the vibration damping performance) with the simple structure, the partition members 51, 52 are not indispensable and any structure without these members 51, 52 is applicable.

A combination of the vehicle-width-direction roof reinforcement and the roof reinforcement located in back of this vehicle-width-direction roof reinforcement in the area enclosed by the pair of right-and-left roof rails 3, 3, the front header 11, and the rear header 12 is not to be limited to the above-described embodiments, any other combination is applicable in the present invention.

For example, in the vehicle Vb of the third embodiment, in place of the rear inclination roof reinforcements 74 which are provided between the front-side cross-shaped roof reinforcement 71 and the rear header 12 of the vehicle Vb of the third embodiment, the rear-side first vehicle-width-direction roof reinforcement 16 of the vehicle of the first embodiment and the rear-side second vehicle-width-direction roof reinforcement 17 may be provided. Further, in the vehicle V of the first embodiment, in place of the rear-side first vehicle-width-direction roof reinforcement 16 and the rear-side second vehicle-width-direction roof reinforcement 17 which are provided between the center pillars 31 and the rear header 12, the rear inclination roof reinforcements 74 of the vehicle Vb of the third embodiment may be provided.

What is claimed is:

1. An upper vehicle-body structure of a vehicle, comprising:
   a pair of right-and-left roof rails extending in a vehicle longitudinal direction at right-and-left both end portions of a roof portion of a vehicle body;
   a roof panel provided between the pair of right-and-left roof rails;
   a front header provided at a front portion of the roof panel in a vehicle width direction;
   a pair of right-and-left front pillars joined to the roof rails at upper portions thereof and extending downward;
   a pair of right-and-left center pillars provided in back of the front pillars, joined to the roof rails at upper portions thereof, and extending downward;
   a vehicle-width-direction roof reinforcement provided in back of the front pillars, and extending in a vehicle width direction such that right-and-left ends of said vehicle-width-direction roof reinforcement are disposed in the vicinity of a joint portion of said center pillar and said roof rail; and
   a pair of right-and-left front inclination roof reinforcements provided at a lower face of the roof panel, wherein each of said front inclination roof reinforcements is configured to extend obliquely from a front portion thereof which is joined to said front header to a rear portion thereof which is positioned on an outward side, in the vehicle width direction, relative to said front portion and joined to said vehicle-width-direction roof reinforcement at a position inward from said roof rail such that a gap exists between said rear portion of said front inclination roof reinforcement and said roof rail in the vehicle-width-direction.

2. The upper vehicle-body structure of the vehicle of claim 1, wherein said a vehicle-width-direction roof reinforcement is provided between said pair of roof rails at a position which overlaps with, in the vehicle longitudinal direction, an arrangement position of said center pillar.

3. The upper vehicle-body structure of the vehicle of claim 2, wherein a partition member is provided inside said front header at a position which does not overlap with, in the vehicle width direction, a joint point of said front inclination roof reinforcement and the front header.

4. The upper vehicle-body structure of the vehicle of claim 3, further comprising:
  a rear header provided at a rear portion of said roof panel in a vehicle width direction;
  an opening portion formed in back of said rear header;
  an openable member provided to cover said opening portion; and
  a pair of right-and-left rear inclination roof reinforcements provided at the lower face of said roof panel,
  wherein each of said rear inclination roof reinforcements is configured to extend obliquely from a rear portion thereof which is joined to said rear header to a front portion thereof which is positioned on the outward side, in the vehicle width direction, relative to said rear portion and joined to said roof rail.

5. The upper vehicle-body structure of the vehicle of claim 2, further comprising:
  a rear header provided at a rear portion of said roof panel in a vehicle width direction;
  an opening portion formed in back of said rear header;
  an openable member provided to cover said opening portion; and
  a pair of right-and-left rear inclination roof reinforcements provided at the lower face of said roof panel,
  wherein each of said rear inclination roof reinforcements is configured to extend obliquely from a rear portion thereof which is joined to said rear header to a front portion thereof which is positioned on the outward side, in the vehicle width direction, relative to said rear portion and joined to said roof rail.

6. The upper vehicle-body structure of the vehicle of claim 1, wherein a partition member is provided inside said front header at a position which does not overlap with, in the vehicle width direction, a joint point of said front inclination roof reinforcement and the front header.

7. The upper vehicle-body structure of the vehicle of claim 6, further comprising:
  a rear header provided at a rear portion of said roof panel in a vehicle width direction;
  an opening portion formed in back of said rear header;
  an openable member provided to cover said opening portion; and
  a pair of right-and-left rear inclination roof reinforcements provided at the lower face of said roof panel,
  wherein each of said rear inclination roof reinforcements is configured to extend obliquely from a rear portion thereof which is joined to said rear header to a front portion thereof which is positioned on the outward side, in the vehicle width direction, relative to said rear portion and joined to said roof rail.

8. The upper vehicle-body structure of the vehicle of claim 1, further comprising:
  a rear header provided at a rear portion of said roof panel in a vehicle width direction;
  an opening portion formed in back of said rear header;
  an openable member provided to cover said opening portion; and
  a pair of right-and-left rear inclination roof reinforcements provided at the lower face of said roof panel,
  wherein each of said rear inclination roof reinforcements is configured to extend obliquely from a rear portion thereof which is joined to said rear header to a front portion thereof which is positioned on the outward side, in the vehicle width direction, relative to said rear portion and joined to said roof rail.

* * * * *